3,325,537
PROCESS OF SOLUBILIZING LIGNITE AND PRODUCING HUMATES
Augustus Earl Beasley, Jr., and Jack C. Cowan, Houston, Tex., assignors to National Lead Company, New York, N.Y., a corporation of New Jersey
No Drawing. Filed Dec. 16, 1964, Ser. No. 418,900
6 Claims. (Cl. 260—501)

This invention relates to the processing of lignite, and more particularly to improvements in the solubilization thereof, especially for subsequent chemical processing.

Lignite, often termed brown coal, is a species of low-grade coal widely distributed throughout the world, and found in commercially important quantities in several localities in the United States, particularly North Dakota, New Mexico, Texas, California, and elsewhere. It contains considerably more oxygen than even low-grade bituminous coal, so that while its value as a fuel is not high, nevertheless it is rich in humic acids. The humic acid content of lignite may be solubilized by treatment with alkalies, such as sodium hydroxide and sodium carbonate. Such a solubilization is the first step in most processes utilizing the humic acid of the lignite, as distinguished from the non-alkali soluble constituents, which comprise the less highly oxidized coal-like matter and considerable ash.

A particular use for the humic acids in lignite comprises their conversion into long chain alkyl ammonium salts thereof, and especially with substituted ammonium salts in which at least one substituent is a straight hydrocarbon chain having from 12 to 22 carbon atoms. Other uses are as dispersants, such as in clay-water systems; as brownish and brownish-yellowish dyes particularly for wood and paper; as components in lead storage-battery plates, and the like.

When solubilization by alkalies is carried out, even when using lignite naturally rich in humic acids, it is found that in order to obtain a good yield of solubilized humates, amounts of alkali are needed which are stoichiometrically excessive, and which moreover lead to a quite high pH in the well-solubilized material. Thus, for example, for a weathered lignite from Bowman County, North Dakota, widely used as a source of soluble humates, if the lignite is ground and added to water to make a fluid slurry and sodium hydroxide is then added, followed by heating to 180° F. and subsequent cooling, when sufficient sodium hydroxide has been thus added to give a resultant pH of 7.0, only about 50% of the lignite will have been brought into solution. If the same process is carried out with enough sodium hydroxide to give a solubilization of 70%, the pH of the resulting mixture will be 7.8. These results are largely independent of the amount of water used, and hold within the practical range of 4 parts to 25 parts of water for each part of lignite.

Now as has been mentioned, one of the important uses of humic acids derived from lignite is in the production of their long chain alkyl ammonium salts. Thus, lauryl ammonium humate may be formed by adding lauryl ammonium chloride to an aqueous solution of sodium humate. Precipitation follows, and the lauryl ammonium humate may be gathered by filtration. In the same fashion, dimethyl-dioctadecyl ammonium bromide may be added to sodium humate, with the ultimate formation of di-methyl-dioctadecyl ammonium humate. These long chain alkyl ammonium salts are useful for a number of purposes, such as in the formulation of oil-base well-working fluids; in non-aqueous, oleaginous molding sand systems; and the like.

We have found that for many purposes, and in particular for the purpose of forming long chain alkyl ammonium humates as described, the pH of the sodium humate solution should be within the limits of 5.2 to 7.5. If the pH is higher, for example, 7.8, then an excessive amount of long chain alkyl ammonium salt must be used to obtain precipitation, and it appears that the organic cation is adsorbed on the humate anion over and above the amount used in metathesis to form the normal salt. This leads to an excessive consumption of the long chain alkyl ammonium salt, as well as to the production of a product excessively rich in the cationic constituent.

Thus, if one solubilizes by means of sodium hydroxide, then the dilemma is faced that either a satisfactory pH of say 7.0 may be achieved with an unsatisfactory yield from the lignite, which in the example already mentioned is only 50%; or if one desires to make a reasonably good extraction from the lignite, of say 70%, the pH must be run up to 7.8. One way out of the dilemma is to follow the latter course, and later acidify partially to bring the pH back to 7.5 or even lower. This again is wasteful of chemicals, and introduces a further step in the processing.

It may be mentioned at this point that in most cases, after solubilization of the general type described, the insoluble constituents are removed by decantation, centrifuging, filtration or the like, so as to result in a relatively clean solution of the soluble humate.

An object of the present invention is to provide a means for solubilizing lignite so as to achieve a solubilization of at least 65% by weight and at the same time obtain a resulting pH within the limits of 5.2 to 7.5.

Other objects of the invention will become apparent as the description thereof proceeds.

Generally speaking, and in accordance with illustrative embodiments of our invention, we grind or otherwise comminute the lignite to at least −40 mesh, and we then bring the comminuted lignite in contact both with a salt of a type to be described more particularly hereinbelow and with sufficient water to form a slurry. The amount of salt used is considerably less than the weight of the lignite, and thus may be described as a minor amount. The water used will depend considerably on the mechanical means used to separate the solubilized solution of the humate from the insoluble constituents. In general, at least four times the weight of the lignite will be used. We scarcely ever will find it necessary to exceed 25 times the weight of lignite. Thus, for each pound of lignite, between 4 and 25 pounds of water will be used, and considerably less than one pound of the salt. Any amount of water within the limits chosen will form a slurry, and the end result after the processing to be described will give a slurry susceptible of clarification by centrifuging, filtration, and the like.

Having brought the three constituents together in the fashion described, we heat the slurry to a temperature of between about 160° F. and 210° F., for at least about 30 minutes. We find that 30 minutes is adequate to bring about solubilization for the particular system chosen; longer heating times do no harm, but in general will not increase the amount of solubilization. We find that 180° F. is a preferred temperature. Also we prefer to agitate the slurry during the time that it is maintained at the elevated temperature. Agitation is particularly helpful if a relatively coarse grind has been used for the lignite, such as −40 mesh, instead of a fine grind such as a −240 mesh. Subsequently we allow the slurry to cool to room temperature. For many purposes it may be used as is, or when desired, the dross may be separated by filtration, decantation, centrifuging, and the like.

We have found that certain inorganic salts are effective in the practice of our invention, and enable the high solubilization recited to be obtained within the pH limits already set forth. These salts are the following: sodium orthosilicate, sodium metasilicate, sodium tetraborate, triodium phosphate, disodium phosphate, sodium tetraphosphate, sodium hexametaphosphate, tetrasodium pyrophosphate, sodium tripolyphosphate, sodium citrate, sodium ammonium hydrogen phosphate, diammonium hydrogen phosphate, and mixtures of any or all of these.

It will be recognized by those familiar with inorganic phosphate chemistry that the recitation of mixtures of the condensed phosphates appearing in the above list really includes all of the so-called glassy sodium phosphates, some of which are now produced and sold under the simple name of "glassy sodium polyphosphate." The latter is considered to be a melt of sodium tripolyphosphate and sodium tetraphosphate, for example.

As examples of the operation of our invention, we give below a tabulation showing the percentage by weight of lignite brought into solution; the resulting pH; and the grams of chemical, that is, the salt chosen from the above list, required per 100 grams of lignite to achieve the solubilization and pH set forth in the table. In all cases, the amount of water used was 10 times the weight of the lignite. As already mentioned, the results which would be obtained at other water ratios within the broad limits already given will scarcely affect the results at all, doubtless because of the highly buffered nature of alkali humate systems. The slurries compounded as set forth were brought to 180° F. and agitated at that temperature for 30 minutes, whereupon they were allowed to cool to room temperature and the pH and degree of solubilization were determined by standard laboratory methods.

TABLE I

| Salt | G. salt per 100 g. lignite | Percent solubilized | pH |
|---|---|---|---|
| Sodium orthosilicate $Na_4SiO_4 \cdot 5H_2O$ | 12 | 69 | 6.8 |
| Sodium metasilicate $Na_2SiO_3 \cdot 5H_2O$ | 20 | 70 | 7.2 |
| Sodium tetraborate | 34 | 69 | 7.5 |
| Sodium tetraborate (5 mols water) | 32 | 69 | 7.5 |
| Sodium tetraborate (10 mols water) | 36 | 69 | 7.5 |
| Trisodium phosphate (12 mols water) | 28 | 72 | 6.3 |
| Sodium tetraphosphate | 30 | 68 | 5.2 |
| Sodium hexametaphosphate | 35 | 69 | 5.3 |
| Tetrasodium pyrophosphate | 14 | 70 | 5.5 |
| Sodium citrate (2 mols water) | 40 | 71 | 5.3 |
| Sodium ammonium hydrogen phosphate ($4H_2O$) | 43 | 70 | 6.1 |
| Ammonium phosphate (dibasic) $(NH_4)_2HPO_4$ | 30 | 72 | 6.2 |

It will be observed that a few of the salts shown in Table I give a pH which is somewhat on the acid side, although within the limits already stated as desirable and satisfactory. In some cases it may be desired to have a less acid solution of the solubilized humate, in which case some sodium hydroxide can be used along with the salt to give a pH in this narrower preferred range of from 6.8 to 7.5. Some examples of this are given in the table which follows:

TABLE II

| Salt | G. salt per 100 g. lignite | G. NaOH per 100 g. lignite | Percent solubilized | pH |
|---|---|---|---|---|
| Tetrasodium pyrophosphate | 5 | 5 | 72 | 6.9 |
| Sodium tetraphosphate | 4 | 6.5 | 69 | 7.0 |
| Sodium hexametaphosphate | 3 | 6 | 70 | 6.8 |

The results shown in Table II make it clear that in these cases there is an advantage in the consumption of chemicals required. Thus, for tetrasodium pyrophosphate, reference to Table I will show that this required 30 grams per 100 grams of lignite, giving a solubilization of 68%; when sodium hydroxide was used at the same time, the amount necessary was reduced to 5 grams, and the solubilization increased to 72%, still at the very neutral pH of 6.9. By way of comparison, with this same lignite, 8 grams of sodium hydroxide were required to give a solubilization which was only 70%, at which ratio the pH was 7.8, which as has been explained is too high for many uses of the solubilized humate.

As further examples within the scope of the invention, the following is given:

To any of the clarified solutions of sodium and/or ammonium humate resulting from the examples of Tables I and II, there is intermixed an aqueous solution (which may be of approximately equal volume) containing an amount of a substituted ammonium compound corresponding to the formula $R_1R_2R_3R_4NX$, where $R_1$ is a straight chain hydrocarbon radical having from 12 to 22 carbon atoms and from 0 to 2 carbon-to-carbon double bonds; $R_2$, $R_3$, and $R_4$ are chosen from the group consisting of $R_1$, alkyl radicals of from 1 to 22 carbon atoms, and hydrogen; and X is a simple anion such as chloride, bromine, acetate; said amount being substantially stoichiometrically equivalent to the said humate contained in the said solution. Upon said intermixture, an insoluble precipitate having the formula $R_1R_2R_3R_4NHu$, where Hu is humate anion, is formed, which is collected, dried, ground, and used as desired. Typical said compounds are cetyl ammonium bromide; oleyl ammonium acetate; and dimethyl-dioctadecyl ammonium chloride.

It will be observed that the invention accomplishes its objects. It should also be borne in mind that while we have illustrated our invention by the aid of various examples, proportions and the like, considerable variation among these is possible, all within the broad scope of the invention, and as set forth in the claims which follow.

We claim:

1. The process of solubilizing lignite to give a solubilized yield of at least 65% by weight at a pH of between 5.2 and 7.5 which comprises: comminuting said lignite to at least minus 40 mesh; bringing said comminuted lignite in contact with a minor amount of a salt chosen from the class consisting of sodium orthosilicate, sodium metasilicate, sodium tetraborate, trisodium phosphate, disodium phosphate, sodium tetraphosphate, sodium hexametaphosphate, tetrasodium pyrophosphate, sodium tripolyphosphate, sodium citrate, sodium ammonium hydrogen phosphate, diammonium hydrogen phosphate, and mixtures thereof and with sufficient water to form a slurry therewith; heating said slurry to a temperature of between about 160° F. and 210° F. for at least about 30 minutes; and thereafter cooling said slurry to room temperature.

2. The process of claim 1 wherein sufficient sodium hydroxide is included in said slurry to give a pH of at least 6.8 but not greater than 7.5.

3. The process of claim 1 in which said slurry is subsequently clarified to remove insoluble constituents.

4. The process of claim 2 in which said slurry is subsequently clarified to remove insoluble constituents.

5. The process of claim 3 in which said clarified slurry is reacted with a humate-equivalent quantity of a substituted ammonium salt in which at least one substituent is a straight hydrocarbon chain having from 12 to 22 carbon atoms.

6. The process of claim 4 in which said clarified slurry is reacted with a humate-equivalent quantity of a substituted ammonium salt in which at least one substituent is a straight hydrocarbon chain having from 12 to 22 carbon atoms.

No references cited.

CHARLES B. PARKER, *Primary Examiner.*

DELBERT R. PHILLIPS, *Assistant Examiner.*